US009959006B2

(12) United States Patent
Carter et al.

(10) Patent No.: US 9,959,006 B2
(45) Date of Patent: May 1, 2018

(54) GENERATING A FORM RESPONSE INTERFACE IN AN ONLINE APPLICATION

(71) Applicant: INTERNATIONAL BUSINESS MACHINES CORPORATION, Armonk, NY (US)

(72) Inventors: Bernadette A. Carter, Raleigh, NC (US); Kathryn L. Mercer, Raleigh, NC (US); Cesar A. Wong, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 563 days.

(21) Appl. No.: 14/275,544

(22) Filed: May 12, 2014

(65) Prior Publication Data

US 2015/0326622 A1    Nov. 12, 2015

(51) Int. Cl.
*H04L 29/06* (2006.01)
*G06F 3/048* (2013.01)
(Continued)

(52) U.S. Cl.
CPC ............ *G06F 3/048* (2013.01); *G06F 3/0482* (2013.01); *G06F 3/04842* (2013.01);
(Continued)

(58) Field of Classification Search
CPC .......................... H04L 65/403; G06F 3/0482; G06F 17/2705; G06F 3/04842; G06F 17/2785;
(Continued)

(56) References Cited

U.S. PATENT DOCUMENTS 5,884,302 A    3/1999 Ho
6,498,921 B1    12/2002 Ho et al.
(Continued)

OTHER PUBLICATIONS

Conley, "How to Get Your Facebook Statistics", available: Apr. 22, 2012, chron.com, https://web.archive.org/web/20120422184058/http://smallbusiness.chron.com/facebook-statistics-29986.html.*
(Continued)

*Primary Examiner* — Kevin L Young
*Assistant Examiner* — Seth A Silverman
(74) *Attorney, Agent, or Firm* — The Steadman Law Firm PLLC

(57) ABSTRACT

An approach is described for generating a form response interface in an online application. An associated system may include a processor and a memory storing an application program, which, when executed on the processor, performs an operation that may include identifying a content post in an online application interface and facilitating evaluation of the content post. Upon determining that the content post is form-addressable based on the evaluation, the operation may include generating a form response interface element including multiple alternatives and updating the online application interface to display the form response interface element with the content post. Facilitating evaluation according to the operation may include parsing language in the content post to determine the presence of a form-addressable interrogatory element. Facilitating evaluation according to the operation further may include analyzing comments posted in response to the content post to determine the presence of form-addressable common language elements.

18 Claims, 13 Drawing Sheets

(51) Int. Cl.
*G06F 3/0482* (2013.01)
*G06F 17/27* (2006.01)
*G06F 3/0484* (2013.01)
*G06F 17/24* (2006.01)
*H04L 29/08* (2006.01)

(52) U.S. Cl.
CPC .......... *G06F 17/241* (2013.01); *G06F 17/243* (2013.01); *G06F 17/2705* (2013.01); *H04L 65/403* (2013.01); *H04L 67/02* (2013.01)

(58) Field of Classification Search
CPC .... G06F 17/274; G06F 17/271; G06F 17/277; G06F 17/2775
See application file for complete search history.

(56) References Cited

U.S. PATENT DOCUMENTS

| | | | |
|---|---|---|---|
| 7,966,316 | B2 | 6/2011 | Cao et al. |
| 2009/0222551 | A1 | 9/2009 | Neely et al. |
| 2010/0287241 | A1* | 11/2010 | Swanburg ......... H04L 29/12047 709/206 |
| 2012/0005224 | A1* | 1/2012 | Ahrens .................. G06Q 10/10 707/769 |
| 2012/0016678 | A1* | 1/2012 | Gruber ................ G06F 17/3087 704/275 |
| 2012/0271837 | A1* | 10/2012 | Kryger ............. G06F 17/30867 707/751 |

OTHER PUBLICATIONS

List of IBM Patents or Patent Applications Treated as Related, dated Apr. 9, 2015.

Anonymous. Embedded Conversation Trackers in EMails, IP.com Prior Art Database Technical Disclosure, Feb. 3, 2012. IPCOM000214722D.

Russo, Joseph. IBM Connections 3.01 Feature Spotlight—Ideation Blogs. Apr. 20, 2011. [retrieved on May 12, 2014] <URL: http://planetlotus.org/profiles/synch-rono-us_88827>.

* cited by examiner

GENERATING A FORM RESPONSE INTERFACE IN AN ONLINE APPLICATION

BACKGROUND

The various embodiments described herein generally relate to content evaluation in an online application. More specifically, the various embodiments describe techniques for generating a form response interface in an online application.

Participants in an online application often submit content to be posted for review and evaluation by other participants. A content post in such online application may include an activity stream update associated with a social network, an electronic mail message, a user comment associated with a weblog posting, a product review submission, or a marketing survey submission. Certain content posts may include questions or other interrogatory elements that may be addressed by selecting a simple affirmative or negative response or by selecting one of a few options. Similarly, participants may respond to certain content posts with an affirmative or negative response or may respond by indicating one of a few options, with relatively little variation among such responses.

Requiring or encouraging open-ended responses to content posts may prevent efficient tallying of responses and furthermore may result in a long and redundant listing of responses within an online application interface. Additionally, an online application participant may be less likely to respond to a content post that requires an open-ended response or that already has a redundant listing of responses from other participants. Consequently, the author of such content post may not receive input from all interested participants.

SUMMARY

The various embodiments of the invention provide techniques for generating a form response interface in an online application. An associated method may include identifying a content post in an online application interface facilitating evaluation of the content post. The content post may include at least one of an activity stream update associated with a social network, an electronic mail message, a user comment associated with a weblog posting, a product review submission, and a marketing survey submission. Upon determining that the content post is form-addressable based on the evaluation, the method may include generating a form response interface element including multiple alternatives and updating the online application interface to display the form response interface element with the content post. According to an embodiment, the multiple alternatives may include at least an affirmative alternative and a negative alternative if the content post includes an interrogatory element requiring an affirmative response or a negative response.

In an embodiment, the method further may include generating statistics based on each of the multiple alternatives. The statistics may include a vote tally indicating at least one of a number of votes received for each of the multiple alternatives and, for each of the multiple alternatives, a number of comments received in response to the content post that are reflective of the alternative. According to such embodiment, the method further may include updating the online application interface to display the statistics with the content post. Additionally, the method may include, upon updating the online application interface to display the statistics with the content post, displaying with the vote tally at least one of, for each of the multiple alternatives, a listing of each user who voted for the alternative and, for each of the multiple alternatives, a listing of each user who provided a comment in response to the content post that is reflective of the alternative. Furthermore, the method may include, upon updating the online application interface to display the statistics with the content post, hiding all responses to the content post upon which the statistics are based.

In a further embodiment, the method step of facilitating evaluation of the content post may include facilitating parsing of language in the content post and, upon determining that parsed language of the content post includes an interrogatory element, sending the parsed language to a natural language processing tool. Upon determining, via data received from the natural language processing tool, that the interrogatory element permits selection of a response among multiple predetermined options, the method step of facilitating evaluation of the content post further may include marking the content post as form-addressable. According to such embodiment, the method step of generating a form response interface element including multiple alternatives may include, for each of the multiple predetermined options, creating a user-selectable alternative element corresponding to the predetermined option and adding the user-selectable alternative element to the form response interface element.

In a further embodiment, the method step of facilitating evaluation of the content post may include identifying one or more comments associated with the content post and, upon determining that a first designated threshold number of associated comments exist, sending language of the associated comments to a natural language processing tool. Upon determining, via the natural language processing tool, that a second designated threshold number of associated comments exist that include common language elements capable of being expressed via multiple predefined options, the method step of facilitating evaluation of the content post further may include marking the content post as form-addressable. According to such embodiment, the method step of generating a form response interface element including multiple alternatives may include, for each of the multiple predefined options, creating a user-selectable alternative element corresponding to the predefined option and adding the user-selectable alternative element to the form response interface element.

An additional embodiment includes a computer program product including a computer readable storage medium having program instructions embodied therewith, wherein the program instructions may be executable by a computing device to cause the computing device to perform one or more steps of above recited method. A further embodiment includes a system having a processor and a memory storing a content management application program, which, when executed on the processor, performs one or more steps of the above recited method.

BRIEF DESCRIPTION OF THE SEVERAL VIEWS OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
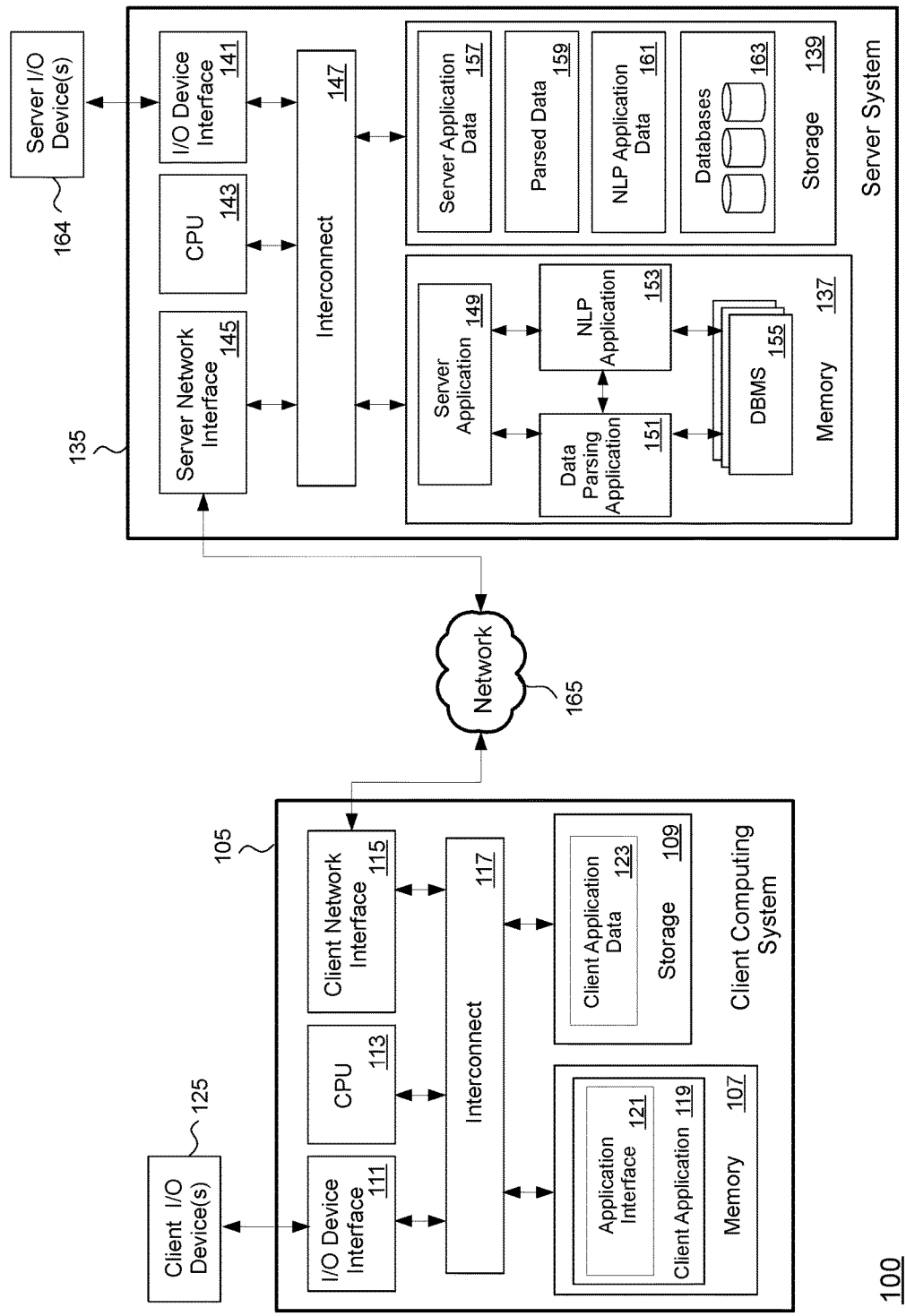
FIG. 1 illustrates a computing infrastructure, according to an embodiment.

The various embodiments described herein are directed to techniques for generating a form response interface for a content post in an online application. In the context of this disclosure, a content post may be an element of content submitted by an online application participant for review and evaluation by other participants. Such content post may include at least one of a textual element, a photograph, and an audiovisual element. Specifically, such content post may include an activity stream update associated with a social network, an electronic mail message, a user comment associated with a weblog posting, a product review submission, or a marketing survey submission. Furthermore, such online application may include an electronic mail client or may involve an online community including at least one of a discussion forum, a social network, a product marketplace, and a weblog.

A client application of a client computing system may identify a newly created or updated content post in an online application interface. The client application may facilitate evaluation of the content post. Upon determining that the content post is form-addressable based on the evaluation, the client application may create a form response interface element including multiple alternatives and further may update the online application interface to display the form response interface element with the content post.

In an embodiment, the client application may facilitate evaluation of the content post by identifying an interrogatory element in language of the content post and by identifying multiple predetermined options with respect to such interrogatory element. According to such embodiment, the client application may facilitate parsing of language in the content post and may send the parsed language to a natural language processing tool upon determining that parsed language of the content post includes an interrogatory element. Furthermore, the client application may mark the content post as form-addressable upon determining, via data received from the natural language processing tool, that the interrogatory element permits selection of a response among multiple predetermined options.

In a further embodiment, the client application may facilitate evaluation of the content post by identifying common language elements in comments associated with the content post and by identifying multiple predefined options corresponding to such common language elements. According to such embodiment, the client application may identify one or more comments associated with the content post and may send language of the associated comments to a natural language processing tool upon determining that a first designated threshold number of associated comments exist. Furthermore, the client application may mark the content post as form-addressable upon determining, via the natural language processing tool, that a second designated threshold number of associated comments exist that include common subject matter capable of being expressed via multiple predefined options.

The various embodiments described herein may have advantages over conventional techniques of evaluating content in an online application. Specifically, generating a form response interface in accordance with the various embodiments may facilitate straightforward evaluation of content posts. Furthermore, generating a form response interface may reduce redundant or superfluous responses to content within an online application interface.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Further, particular embodiments describe techniques for generating a form response interface in an online application. However, it should be understood that the techniques described herein may be adapted to a variety of purposes in addition to those specifically described herein. Accordingly, references to specific embodiments are included to be illustrative and not limiting.

FIG. 1 illustrates a computing infrastructure 100 according to an embodiment. As shown, computing infrastructure 100 includes a client computing system 105 and a server system 135, each connected to a communications network 165.

Illustratively, client computing system 105 may include a memory 107, storage 109, input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. Memory 107 may include a client application 119. Client application 119 may be an online application configured for interfacing with server system 135 and other computing systems. Client application 119 may include an online application interface 121. Storage 109 may include client application data 123 associated with client application 119. I/O device interface 111 may be communicatively coupled to one or more client I/O devices 125. CPU 113 is included to be representative of a single CPU, multiple CPUs, a single CPU having multiple processing cores, and the like. Client network interface 115 may receive data from and transmit data to server system 135 via network 165.

Server system 135 may include a memory 137, storage 139, I/O device interface 141, a CPU 143, and a server network interface 145, all of which may be interconnected via interconnect 147 (e.g., a bus). Although shown as a single computing system, server system 135 is included to be representative of a single server system or multiple server systems. Memory 137 may include a server application 149, a data parsing application 151, a natural language processing (NLP) application 153, and a database management system (DBMS) 155. DBMS 155 is included be representative of a single database system or multiple database systems. Storage 139 may include server application data 157, parsed data 159, NLP application data 161, and databases 163. Server application 149 may generate and process server application data 157 based on interaction with client computing system 105. To address requests of client computing system 105, server application 149 may send such requests to data parsing application 151 or language processing application 153. Data parsing application 151 may send database requests to DBMS 155, and data parsing application 151 may process results returned by DBMS 155 to generate parsed data 159. Furthermore, data parsing application 151 may communicate directly with NLP application 153. Additionally, NLP application 153 may send requests to DBMS 155 to determine one or more language relationships and to generate NLP application data 161. DBMS 155 may include a software application configured to manage databases 163. Databases 163 may include one or more relational databases. Additionally, databases 163 may include one or more ontology trees or other ontological structures. While FIG. 1 illustrates three databases 163, computing infrastructure 100 may include any number of databases. According to an embodiment, DBMS 155 may send requests to remote databases (not shown) via network 165.

I/O device interface 141 may be communicatively coupled to one or more server I/O devices 164. CPU 143 is included to be representative of a single CPU, multiple CPUs, a single CPU having multiple processing cores, and the like. Server network interface 145 may receive data from and transmit data to client computing system 105 via network 165. Specifically, server application 149 may accept requests sent by client computing system 105 to server system 135 and may transmit data to client computing system 105 via server network interface 145.

Figure 2:
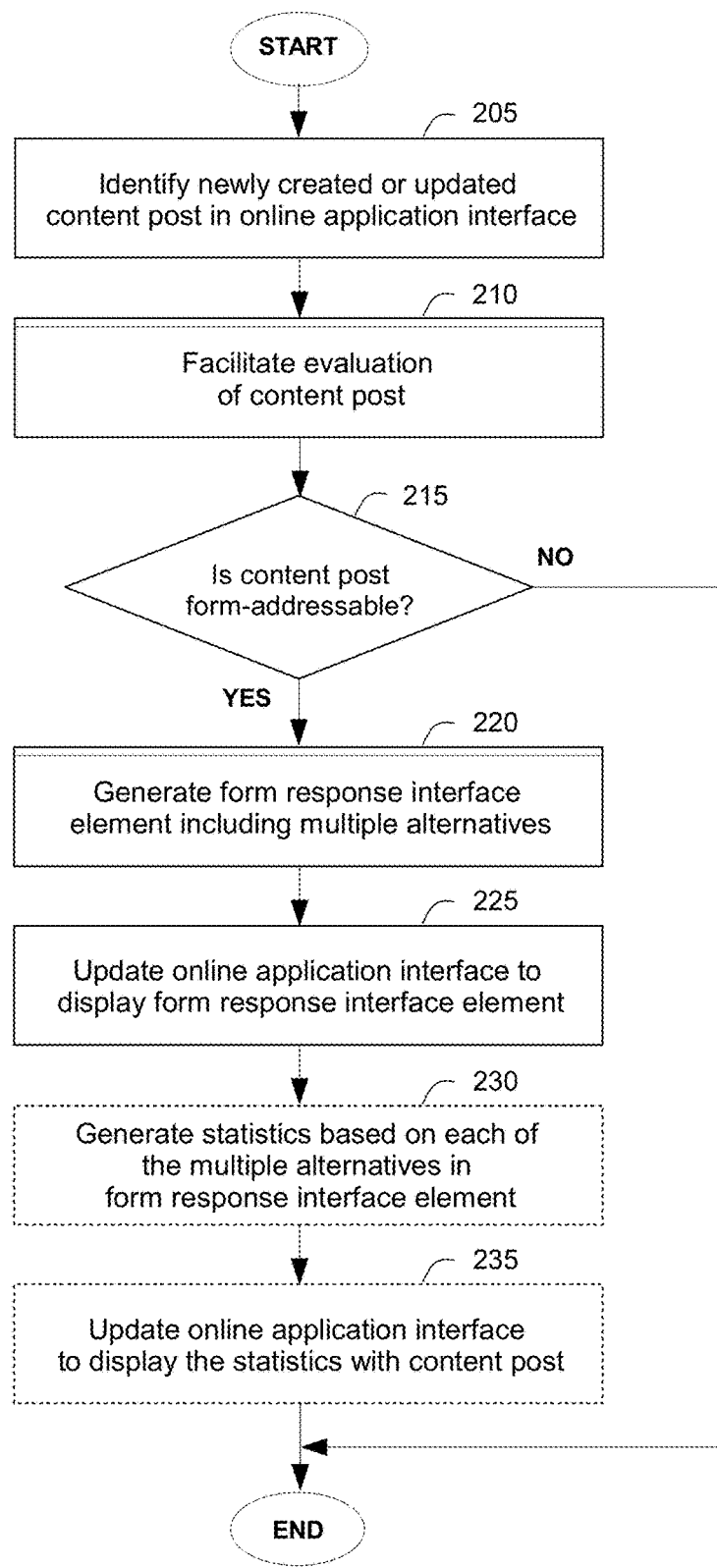
FIG. 2 illustrates a method of generating a form response interface for a content post in an online application, according to an embodiment.

FIG. 2 illustrates a method 200 of generating a form response interface for a content post in an online application, according to an embodiment. Specifically, the content post may include an activity stream update associated with a social network, an electronic mail message, a user comment associated with a weblog posting, a product review submission, a marketing survey submission, or any other post associated with an online application. The content post may include at least one of a textual element (e.g., having typed or written text), a photograph, and an audiovisual element (e.g., an audio or video sample). Furthermore, the online application may include an electronic mail client or may involve an online community including a discussion forum, a social network, a product marketplace, a weblog, or any other online entity involving a group of participants. The online application may be a client application (e.g., client application 119) running on a client computing system (e.g., client computing system 105). The client application may facilitate generation of a form response interface element according to the method 200. Furthermore, the client application may display the form response interface element in an online application interface (e.g., online application interface 121) according to the method 200.

The method 200 may begin at step 205, where the client application may identify a newly created or updated content post in an online application interface. For example, the client application may detect an addition of a new content post by an online application participant. In a further example, the client application may detect a update to an existing content post, such as a comment posted in response thereto. In an embodiment, the client application may identify a newly created or updated content post at a point in time following a specified time interval. According to such embodiment, the client application may provide a user an option to adjust such time interval. Establishment or adjustment of such time interval may be based upon processing requirements of the client application or capabilities of the client computing system. In an alternative embodiment, the client application may identify a newly created or updated content post immediately upon creation or update of the content post.

At step 210, the client application may facilitate evaluation of the newly created or updated content post to determine whether the content post is form-addressable. Techniques for facilitating evaluation of the content post are further described herein with respect to FIGS. 3 and 5. Specifically, as further discussed herein with respect to FIG. 3, the client application may facilitate parsing of language in the newly created or updated content post to determine the presence of a form-addressable interrogatory element. As further discussed herein with respect to FIG. 5, the client application may analyze comments posted in response to the content post to determine the presence of form-addressable common language elements.

At step 215, the client application may determine whether the content post is form-addressable based on the evaluation. In the context of this disclosure, a content post is form-addressable if it is addressable via a form having one or more predetermined or predefined options. According to embodiments, the client application may detect whether the content post has been marked as form-addressable based on the presence of an interrogatory element (as further described herein with respect to FIG. 3) or based on the presence of common language elements (as further described herein with respect to FIG. 5). Upon determining that the content post is not form-addressable, the method 200 may end.

Upon determining that the content post is form-addressable, the method 200 may proceed to step 220, where the client application may generate a form response interface element for the content post including multiple alternatives. In an embodiment, the multiple alternatives may include at least an affirmative alternative and a negative alternative if the content post includes an interrogatory element requiring an affirmative response or a negative response. Techniques for generating a form response interface element are further described herein with respect to FIGS. 4 and 6. At step 225, the client application may update the online application interface to display the form response interface element with the content post. In an embodiment, the client application may display the form response interface element immediately below or otherwise adjacent to the language of the content post.

Optionally, at step 230 the client application may generate statistics based on each of the multiple alternatives included in the generated form response interface element. In an embodiment, the generated statistics may include a vote tally. Such vote tally may indicate attributes reflecting responses to the content post. Specifically, such vote tally may indicate a number of votes received for each of the multiple alternatives via the form response interface element. Furthermore, such vote tally may indicate, for each of the multiple alternatives, a number of comments received in response to the content post that are reflective of the alternative—i.e., a number of comments having language consistent with the alternative but posted separately from the form response interface element.

Optionally, at step 235 the client application may update the online application interface to display the statistics with the content post. The statistics may be displayed adjacent to the form response interface element and/or the language of the content post. In an embodiment, the statistics may be displayed automatically upon receiving a designated threshold number of votes in the form response interface element. In an alternative embodiment, the client application may present in the online application interface a user-selectable option to display the statistics. Upon displaying statistics according to step 235, the client application may present in the online application interface further user-selectable options pertaining to the statistics. Specifically, upon updating the online application interface to display the statistics, the client application may provide an option to display with the vote tally, for each of the multiple alternatives, a listing of each user who voted for the alternative. Additionally, upon updating the online application interface to display the statistics, the client application may provide an option to display, for each of the multiple alternatives, a listing of each user who provided a comment in response to the content post that is reflective of the alternative. Such user listings may include textual listings of names and/or other indicia representing the users (e.g., user identifiers such as thumbnail images). Furthermore, upon updating the online application interface to display the statistics, the client application may provide an option in the online application interface to hide all responses to the content post (e.g., comments) upon which the statistics are based. By providing an option to hide all such responses upon display of the statistics, the client application may enable an online application participant to reduce display of redundant content in the online application interface.

Figure 3:
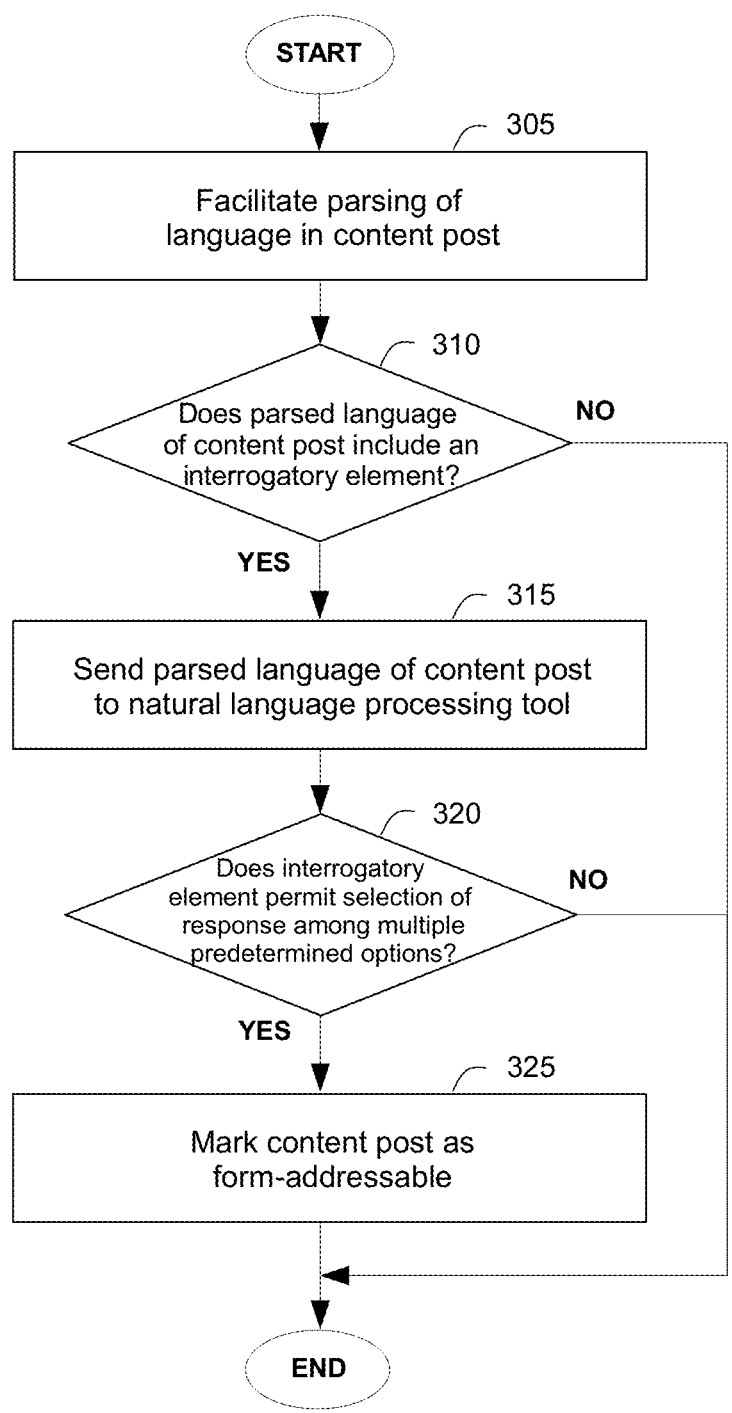
FIG. 3 illustrates a method of facilitating evaluation of the content post, according to an embodiment.

FIG. 3 illustrates a method 300 of facilitating evaluation of the content post. The method 300 provides an embodiment with respect to step 210 of the method 200. According to the method 300, the client application may determine whether the content post is form-addressable. Specifically, the client application may determine the viability of predetermined response options for the content post by evaluating language in the content post.

The method 300 may begin at step 305, where the client application may facilitate parsing of language in the content post. In an embodiment, the client application may send the language to a data parsing application on a server system (e.g., data parsing application 151 of server system 135). The data parsing application may generate parsed language (e.g., parsed data 159) corresponding to elements of the content post and may return the parsed language to the client application. At step 310, the client application may determine whether the parsed language includes an interrogatory element. In the context of this disclosure, an interrogatory element is a word or phrase indicating a question or other explicit request for a response. Punctuation (e.g., a question mark) may indicate the presence of an interrogatory element. In an embodiment, to determine whether the parsed language includes an interrogatory element, the client application may communicate with a natural language processing tool (e.g., NLP application 153 on server system 135). According to such embodiment, the tool may analyze the parsed language to determine the presence of interrogatory text or punctuation. Upon determining that the parsed language does not include an interrogatory element, the method 300 may end.

Upon determining that the parsed language includes an interrogatory element, at step 315 the client application may send the parsed language of the content post to the natural language processing tool. In an embodiment, the natural language processing tool may analyze the format of the interrogatory element in the parsed language and consequently may associate any relevant predetermined options with the interrogatory element. The natural language processing tool may generate application data (e.g., NLP application data 161) based on any created associations and may return the application data to the client application.

In an alternative embodiment, steps 310 and 315 may be carried out via direct communication between the data parsing application and the natural language processing tool. According to such embodiment, the data parsing application may parse language of the content post and may send the parsed language directly to the natural language processing tool. The natural language processing tool then may determine the presence of an interrogatory element in the parsed language and, upon determining the presence of an interrogatory element, may associate any relevant predetermined options with the interrogatory element in the parsed language. Subsequently, as described above, the natural language processing tool may generate application data based on any created associations and may return the application data to the client application.

At step 320, the client application may determine whether the interrogatory element determined from the parsed language of the content post permits selection of a response among multiple predetermined options. The client application may make such determination based on data generated by the natural language processing tool (e.g., the aforementioned application data). Upon determining that the interrogatory element does not permit selection of a response among multiple predetermined options, the method 300 may end. Conversely, upon determining that the interrogatory element permits selection of a response among multiple predetermined options, at step 325 the client application may mark the content post as form-addressable.

Figure 4:
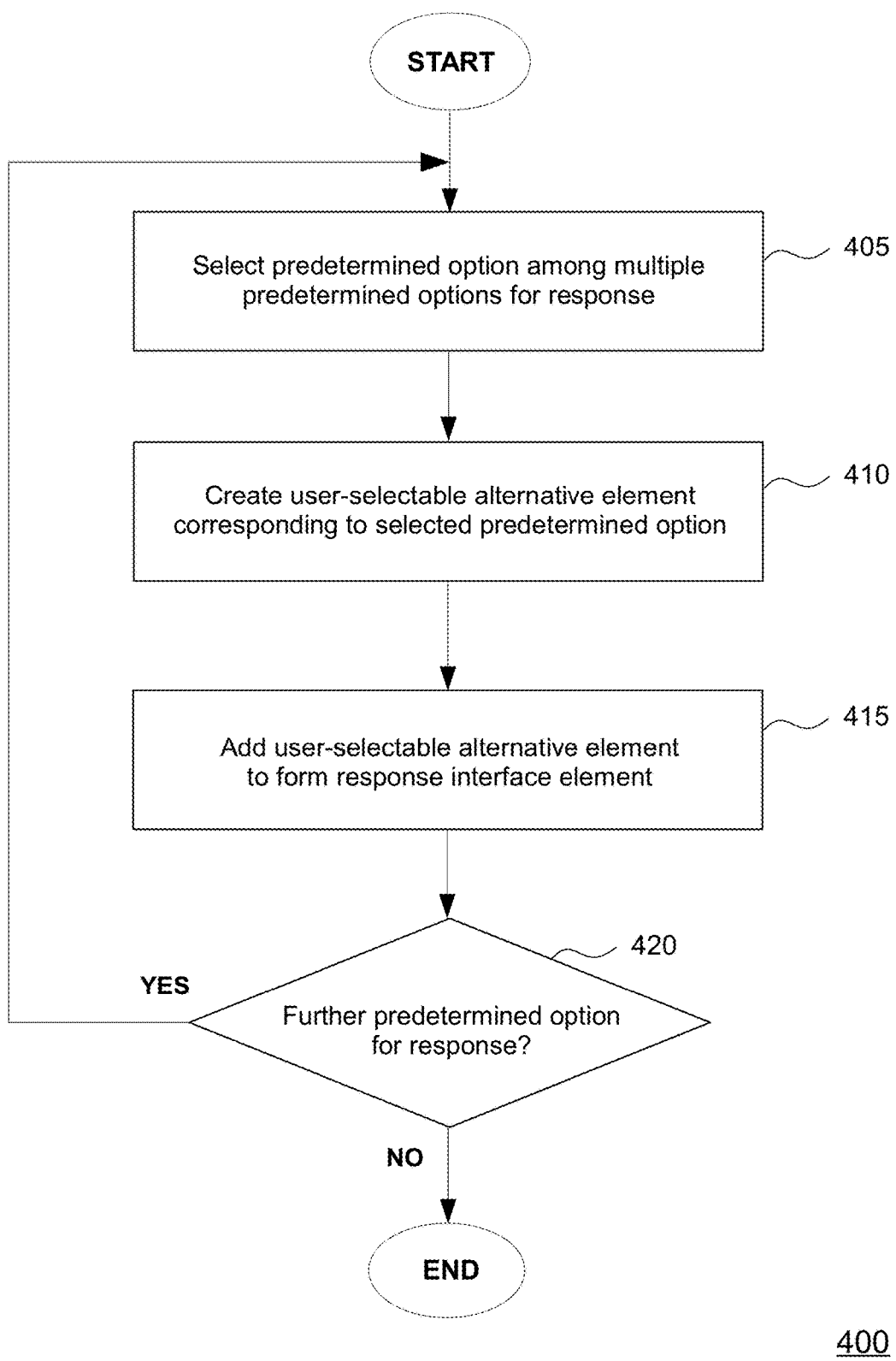
FIG. 4 illustrates a method of generating a form response interface element including multiple alternatives, according to an embodiment.

FIG. 4 illustrates a method 400 of generating a form response interface element including multiple alternatives. The method 400 provides an embodiment with respect to step 220 of the method 200. The multiple alternatives according to the method 400 respectively may correspond to the multiple predetermined options for response as identified in the method 300.

The method 400 may begin at step 405, where the client application may select a predetermined option among the multiple predetermined options for response. At step 410, the client application may create a user-selectable alternative element corresponding to the selected predetermined option. At step 415, the client application may add the user-selectable alternative element to the form response interface element. In an embodiment, the user-selectable alternative element may include text or a graphic corresponding to the predetermined option and an element such as a radio button or check box to facilitate user selection of the option within the form response interface element. In a further embodiment, text or a graphic corresponding to the predetermined option may be added to a drop-down list element within the form response interface element.

At step 420, the client application may determine whether there is a further predetermined option for response to be selected. Upon determining that there is no further predetermined option to be selected, the method 400 may end. Upon determining that there is a further predetermined option to be selected, the method 400 may return to step 405.

In an embodiment, the client application may be capable of identifying and processing multiple interrogatory elements within a content post according to the steps of the methods 300 and 400. According to such embodiment, the client application may generate a respective form response interface element including multiple alternatives for each identified interrogatory element. For instance, upon identifying two interrogatory elements, the client application may generate two form response interface elements, each respectively corresponding to one of the two interrogatory elements.

Figure 5:
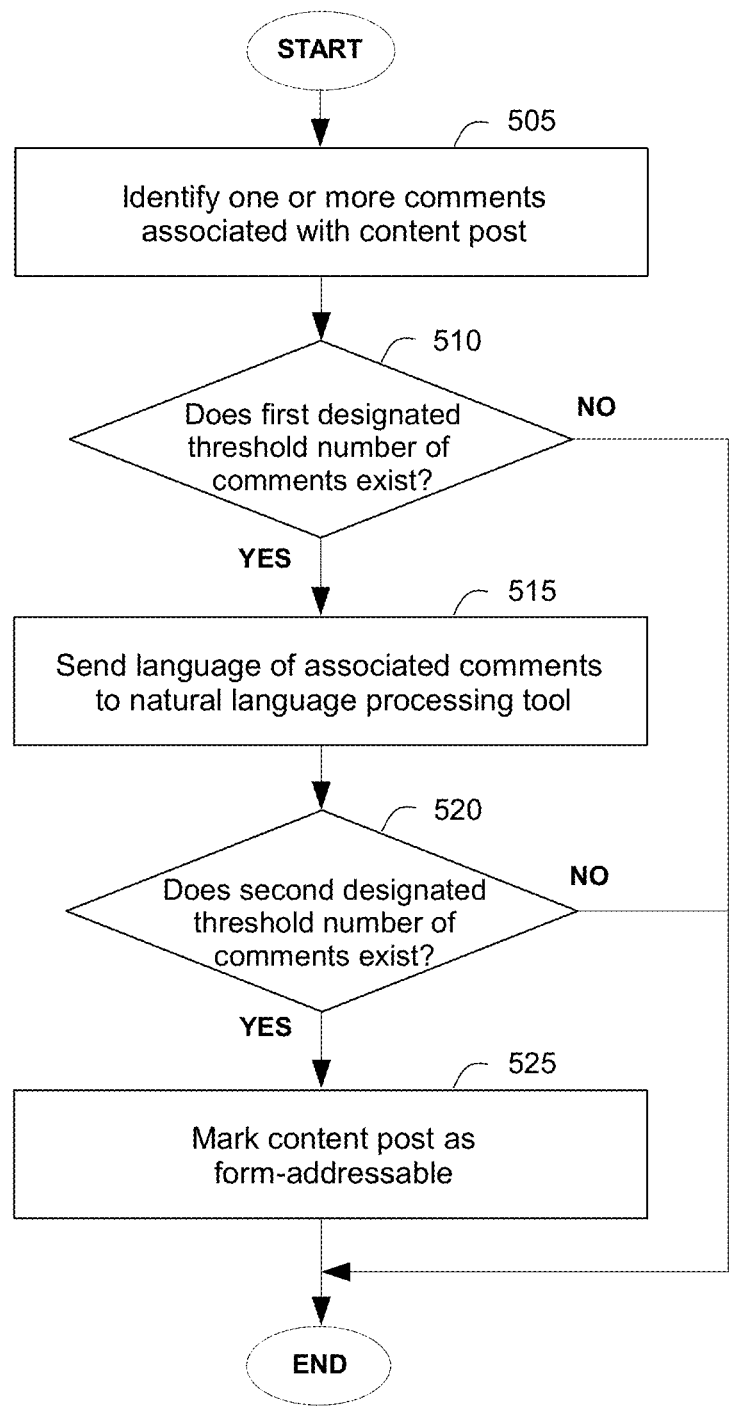
FIG. 5 illustrates a method of facilitating evaluation of the content post, according to a further embodiment.

FIG. 5 illustrates a method 500 of facilitating evaluation of the content post. The method 500 provides a further embodiment with respect to step 210 of the method 200. According to the method 500, the client application may determine whether the content post is form-addressable. Specifically, the client application may determine the viability of predefined response options for the content post by evaluating language in comments posted in response to the content post.

The method 500 may begin at step 505, where the client application may identify one or more comments associated with the content post. In the context of this disclosure, a comment associated with the content post may include any submission by an online application participant that is provided in response to the content post. A comment associated with the content post may be displayed immediately below or otherwise adjacent to the language of the content post in the online application interface. At step 510, the client application may determine whether a first designated threshold number of comments associated with the content post exist. In one embodiment, the first designated threshold value may be predefined by the client application. In an alternative embodiment, the client application may assign a default first designated threshold value and may provide a user option to modify the value. Through the first designated threshold value, the client application may establish a minimum number of comments required in order to proceed with the steps of the method 500. Upon determining that a first designated threshold number of comments associated with the content post does not exist, the method 500 may end.

Upon determining that a first designated threshold number of comments associated with the content post exist, at step 515 the client application may send language of the associated comments to the aforementioned natural language processing tool (or a similar tool). At step 520, the client application may determine, via the natural language processing tool, whether a second designated threshold number of associated comments exist that include common language elements capable of being expressed via multiple predefined options. In an embodiment, the second designated threshold value may be less than the first designated threshold value. In an alternative embodiment, the second designated threshold value may be equal to the first designated threshold value.

According to an embodiment, the natural language processing tool may determine whether common language elements exist among a second designated threshold number of comments by iteratively comparing the language of each comment to the language of each other comment to determine a direct match relationship or a synonymous relationship between respective hashtags, words, and/or phrases. A direct match relationship in the context of the disclosure exists when a hashtag, word, or phrase in one of the comments is identical to a hashtag, word, or phrase in another comment. A hashtag in this context may include any language element preceded by a hash symbol (#), and a phrase in this context may include a grouping of words expressing a complete thought as determined by the natural language processing tool. A synonymous relationship in the context of the disclosure exists when a hashtag, word, or phrase in one of the comments is synonymous, but not identical, to a hashtag, word, or phrase in another comment. Upon determining that common language elements exist among a second designated threshold number of comments, the natural language processing tool may identify any relevant predefined options for response based on an analysis of the common language elements. Details with respect to such analysis may depend upon the common language elements analyzed by the natural language processing tool. For example, if the common language elements indicate affirmative language, the natural language processing tool may identify "yes" as a predefined option based on the affirmative language and further may identify "no" as another predefined option. In another example, if the common language elements indicate one or more choices (e.g., option "A" and option "B") in response to the content post, the natural language processing tool may identify such one or more choices as respective predefined options.

According to a further embodiment, in the process of determining the presence of common language elements, the natural language processing tool may primarily consider hashtags when iteratively comparing the language of each comment to each other comment. For instance, when comparing language of two comments including hashtags, the natural language processing tool primarily may consider the language within the respective hashtags and subsequently may consider other language (e.g., only if the language within the respective hashtags is inconclusive). By considering language according to this embodiment, the natural language processing tool may provide precedence to hashtags, which may provide a succinct representation of the information provided in comments to the content post.

Upon determining at step 520 that a second designated threshold number of associated comments do not exist that include common language elements capable of being expressed via multiple predefined options, the method 500 may end. Conversely, upon determining that a second designated threshold number of associated comments exist that include common language elements capable of being expressed via multiple predefined options, at step 525 the client application may mark the content post as form-addressable.

Figure 6:
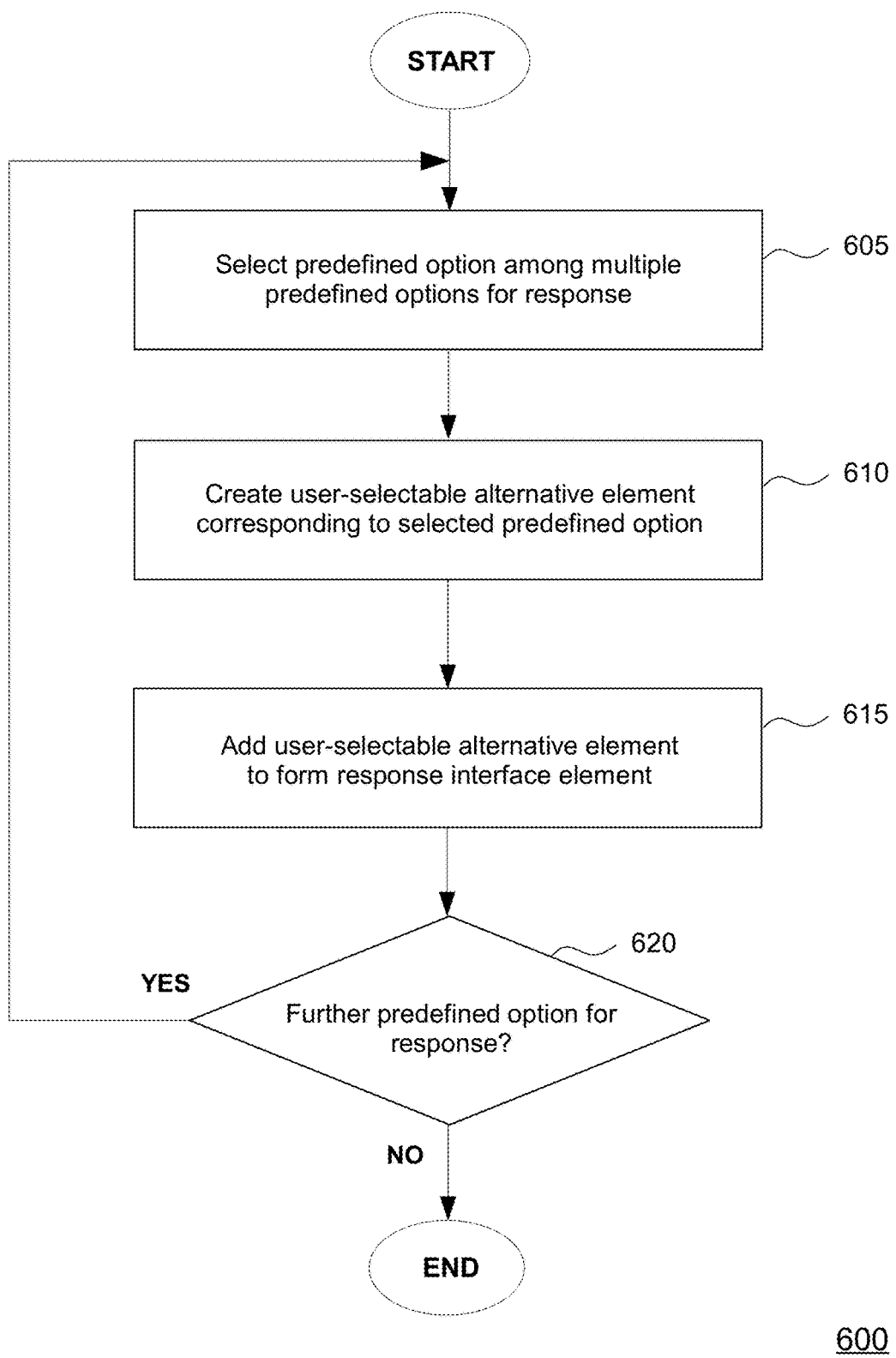
FIG. 6 illustrates a method of generating a form response interface element including multiple alternatives, according to a further embodiment.

FIG. 6 illustrates a method 600 of generating a form response interface element including multiple alternatives. The method 600 provides a further embodiment with respect to step 220 of the method 200. The multiple alternatives according to the method 600 respectively may correspond to the multiple predefined options for response as identified in the method 500.

The method 600 may begin at step 605, where the client application may select a predefined option among the multiple predefined options for response. At step 610, the client application may create a user-selectable alternative element corresponding to the selected predefined option. At step 615, the client application may add the user-selectable alternative element to the form response interface element. In an embodiment, the user-selectable alternative element may include text or a graphic corresponding to the predefined option and an element such as a radio button or check box to facilitate user selection of the option within the form response interface element. In a further embodiment, text or a graphic corresponding to the predefined option may be added to a drop-down list element within the form response interface element.

At step 620, the client application may determine whether there is a further predefined option for response to be selected. Upon determining that there is no further predefined option to be selected, the method 600 may end. Upon determining that there is a further predefined option to be selected, the method 600 may return to step 605.

According to an embodiment, the steps of the methods 200-600 may be carried out by the server application on the server system (e.g., server application 149) or an application of another computing system rather than the client application on the client computing system. For instance, if the client computing system is a thin client, all processing may occur at the server system, and relevant data required for display of the client online community interface may be sent to the client computing system via the network.

Figure 7:
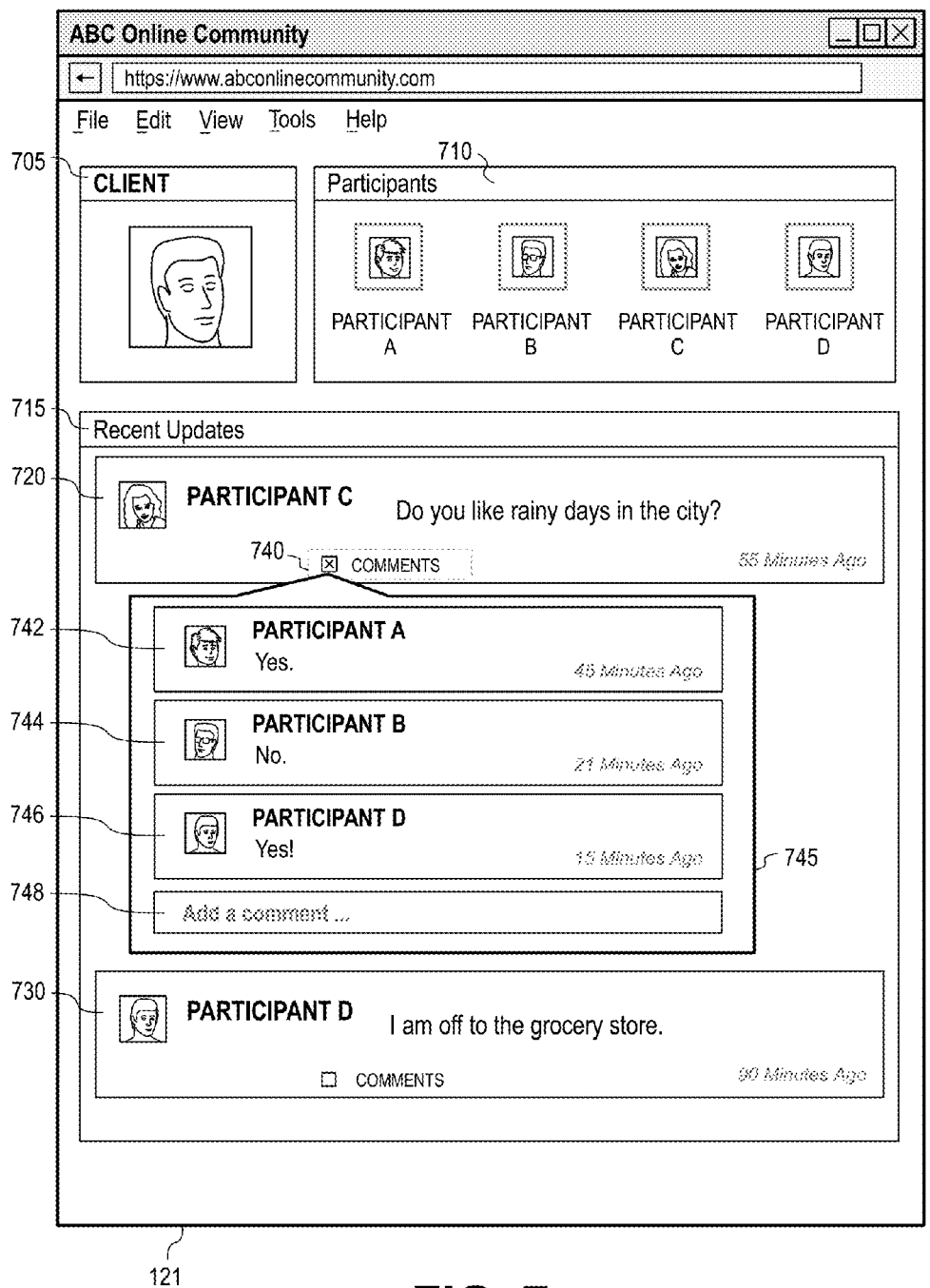
FIG. 7 illustrates a client online application interface, according to an embodiment.

FIG. 7 illustrates online application interface 121 as presented by client application 119 running in memory 107 of client computing system 105, according to an embodiment. Online application interface 121, which in this particular embodiment displays aspects of an online community, may include a client identification section 705, a participant identification section 710, and an activity stream 715. Client identification section 705 may include a profile identifier for a user of client application 119. Participant identification section 710 may include all or a subset of participants associated with the user within client application 119. As shown, client identification section 705 includes a profile identifier in the form of a thumbnail image for the client, and participant identification section 710 includes respective profile identifiers in the form of thumbnail images for Participant A, Participant B, Participant C, and Participant D.

Activity stream 715 may display recent activity stream updates associated with the client and the participants included in participant identification section 710. Each activity stream update may include a content post. Activity stream 715 may include activity stream updates in temporal order, with the newest activity stream update toward the top. According to alternative embodiments, activity stream updates may be presented within activity stream 715 in alternative ways. As shown in FIG. 7, activity stream 715 includes activity stream update 720 posted by Participant C and activity stream update 730 posted by Participant D. Each activity stream update may include an option 740 to display or enter comments posted in response to the update or otherwise associated with the update. Since option 740 is selected for activity stream update 720, online application interface 121 in this example displays comment dialog box 745 including comments posted in response to activity stream update 720. Such comments may be presented within comment dialog box 745 in temporal order, with the newest comment at the bottom of the box. According to alternative embodiments, comments may be presented within comment dialog box 745 in alternative ways. Comment dialog box 745 includes comment 742 posted by Participant A, comment 744 posted by Participant B, and comment 746 posted by Participant D. Additionally, comment dialog box 745 includes a text box element 748, which may accept new comments in response to activity stream update 720.

Figure 8:
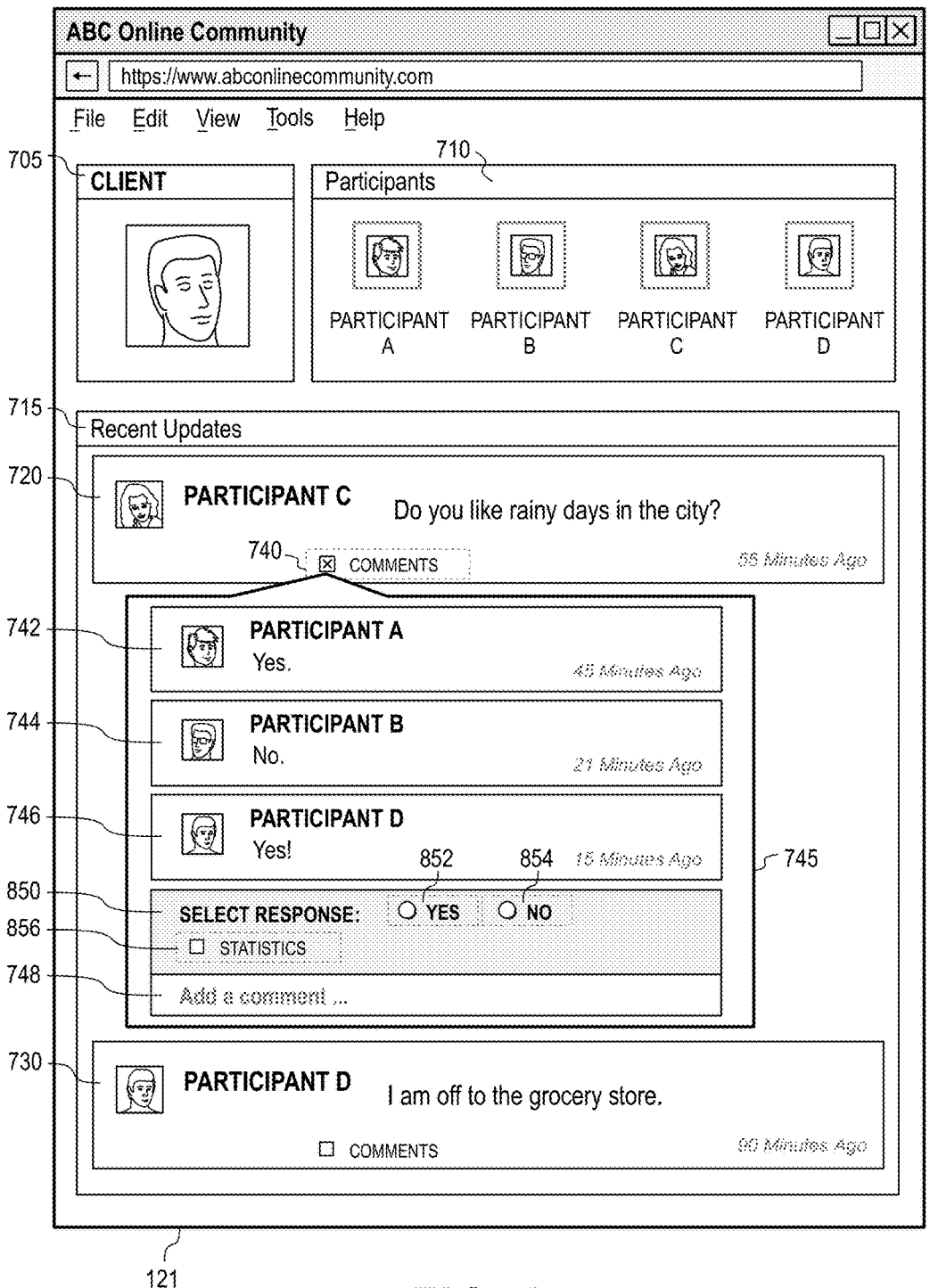
FIGS. 8 and 9 illustrate an example scenario of generating and displaying a form response interface for a content post in the online application interface illustrated in FIG. 7, according to an embodiment.
Figure 9:
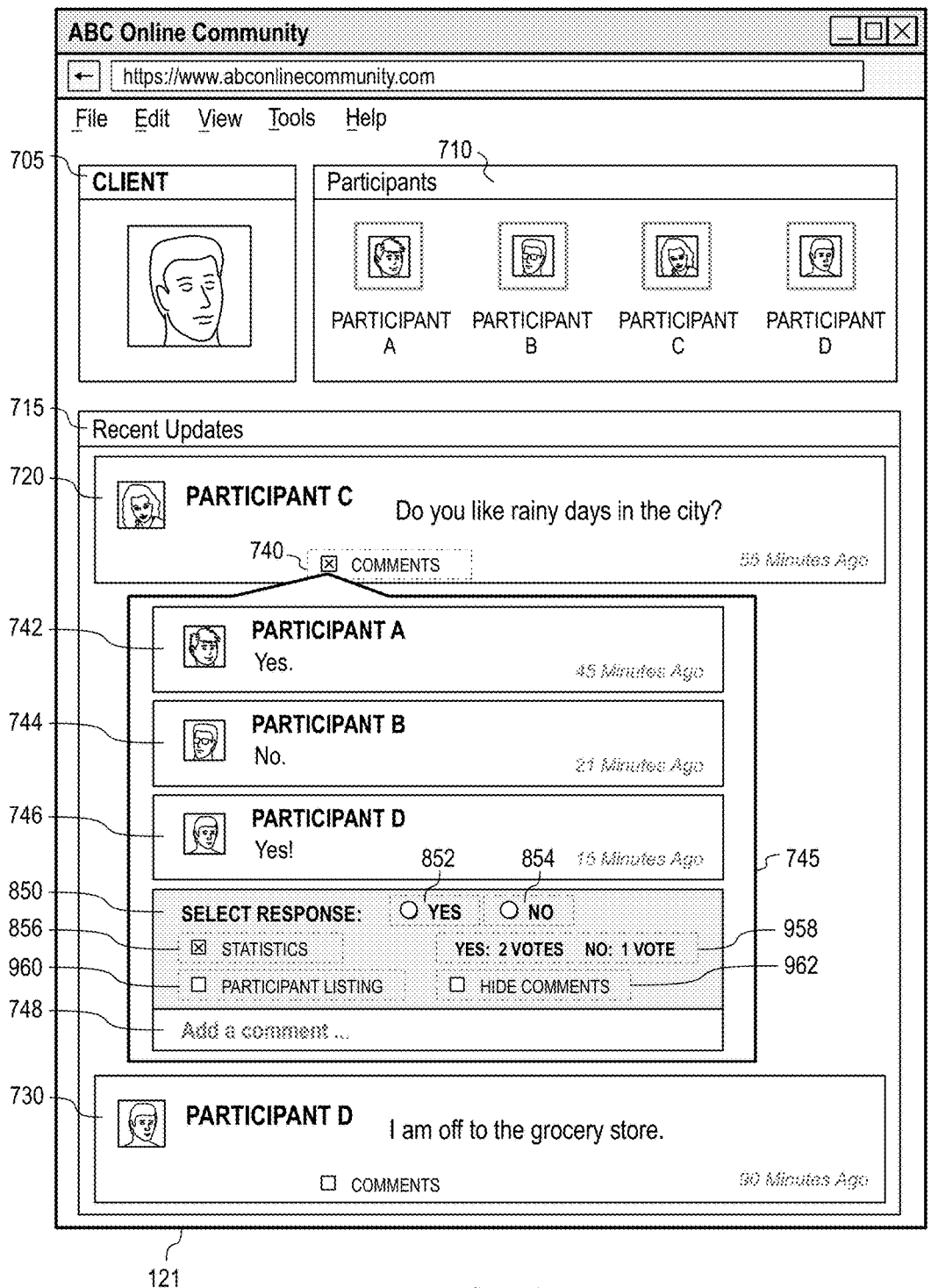

FIGS. 8 and 9 illustrate an example scenario of generating and displaying a form response interface in online application interface 121 as provided in FIG. 7. More specifically, in this example, client application 119 may update online application interface 121 to display a form response interface element according to the methods 200-400. According to step 205 of the method 200, client application 119 may identify a newly updated content post. Specifically, client application 119 may identify, at a point in time following a specified time interval assumed to be 60 minutes for purposes of this example, activity stream update 720 and comments 742, 744, and 746. According to step 210, client application 119 may facilitate evaluation of the content post within activity stream update 720. In this example, client application may facilitate such evaluation according to steps of the method 300.

According to step 305 of the method 300, client application 119 may facilitate parsing of the language of the content post in activity stream update 720. Specifically, client application 119 may send the language in activity stream update 720 to data parsing application 151, which may generate and return parsed language to client application 119. According to step 310, client application 119 may determine that the parsed language includes an interrogatory element. In this example, client application 119 may determine that the phrase "Do you like" within the content post is an interrogatory element. According to step 315, client application may send the parsed language to NLP application 153, which may analyze the format of the interrogatory element and consequently may associate any relevant predetermined options with the interrogatory element in the parsed language of the content post. In this example, NLP application 153 may associate an affirmative alternative (e.g., "YES") and a negative alternative (e.g., "NO") with the interrogatory element "Do you like" within the parsed language of the content post. NLP application 153 may generate NLP application data 161 based on such association and may return the data to client application 119. According to step 320, based on the data generated by NLP application 153, the client application 119 may determine that the interrogatory element "Do you like" permits selection of a response among multiple predetermined options, specifically an affirmative alternative (e.g., "YES") and a negative alternative (e.g., "NO"). Consequently, according to step 325 client application 119 may mark the content post of activity stream update 720 as form-addressable.

Subsequently, according to step 215, client application 119 may determine that the content post of activity stream update 720 is form-addressable based on the marking of the content post according to step 325. As shown in FIG. 8, according to steps 220 and 225, client application 119 may generate a form response interface element 850 and may update online application interface 121 to display the generated form response interface element 850. Form response interface element 850 may be included within comment dialog box 745. In this example, client application 119 may generate form response interface element 850 according to steps of the method 400. According to the method 400, for each predetermined option identified at step 320, client application 119 may create a user-selectable alternative element and may add such user-selectable alternative element to form response interface element 850. Specifically, since an affirmative alternative (e.g., "YES") and a negative alternative (e.g., "NO") were identified at step 320, client application 119 may create and add to form response interface element 850 an affirmative user-selectable alternative element 852 corresponding to the affirmative alternative ("YES") and a negative user-selectable alternative element 854 corresponding to the negative alternative ("NO"). Alternative elements 852 and 854 each may include a radio button selectable by the user.

According to step 230, client application 119 may generate statistics based on each of the user-selectable alternative elements 852 and 854 included in form response interface element 850. Specifically, client application 119 may create a vote tally that reflects responses received for the content post of activity stream update 720. As shown in FIG. 8, online application interface 121 may include an option 856 to display such statistics. In an alternative embodiment, client application 119 may update online application interface 121 to display statistics automatically upon receiving a threshold number of votes and/or comments.

According to step 235, client application 119 may update online application interface 121 to display the generated statistics with the content post of activity stream update 720. Specifically, as shown in FIG. 9, due to selection of option 856, client application 119 has updated online application interface 121 to display statistics 958 within form response interface element 850. In this example, statistics 958 include the aforementioned vote tally reflecting responses received for the content post of activity stream update 720. The vote tally may indicate a number of votes received for each of the user-selectable alternative elements 852 and 854 via form response interface element 850 and additionally may indicate, for each of the user-selectable alternative elements 852 and 854, a number of comments received in response to the content post that are reflective of the alternative element. In this example, comments 742 and 746 reflect affirmative user-selectable alternative element 852, while comment 744 reflects negative user-selectable alternative element 854. Accordingly, the vote tally may include two "YES" votes reflective of affirmative user-selectable element 852 (based on comments 742 and 746) and further may include one "NO" vote reflective of user-selectable element 854 (based on comment 744). For purposes of this example, it is assumed that no votes have been received for the user-selectable alternative elements 852 and 854 directly via form response interface element 850; thus, the vote tally in this example only reflects comments 742, 744, and 746.

Client application 119 may provide further options with respect to the display of statistics 958. More specifically, client application 119 may provide in online application interface 121 an option 960 to display with the vote tally a listing including, for each of the user-selectable alternative elements 852 and 854, each online application participant who selected the alternative element and each online application participant who provided a comment to the content post reflective of the alternative element. Alternatively, client application 119 may provide in online application interface 121 a separate option (not shown) to display with the vote tally a listing, for each of the user-selectable alternative elements 852 and 854, including each online application participant who selected the alternative element and/or a separate option (not shown) to display with the vote tally a listing, for each of the user-selectable alternative elements 852 and 854, including each online application participant who provided a comment to the content post reflective of the alternative element. Furthermore, client application 119 may provide in online application interface 121 an option 962 to hide all responses to the content post upon which statistics 958 are based. In this example, upon selection of option 962, client application 119 may update online application interface 121 to hide comments 742, 744, and 746.

Figure 10:
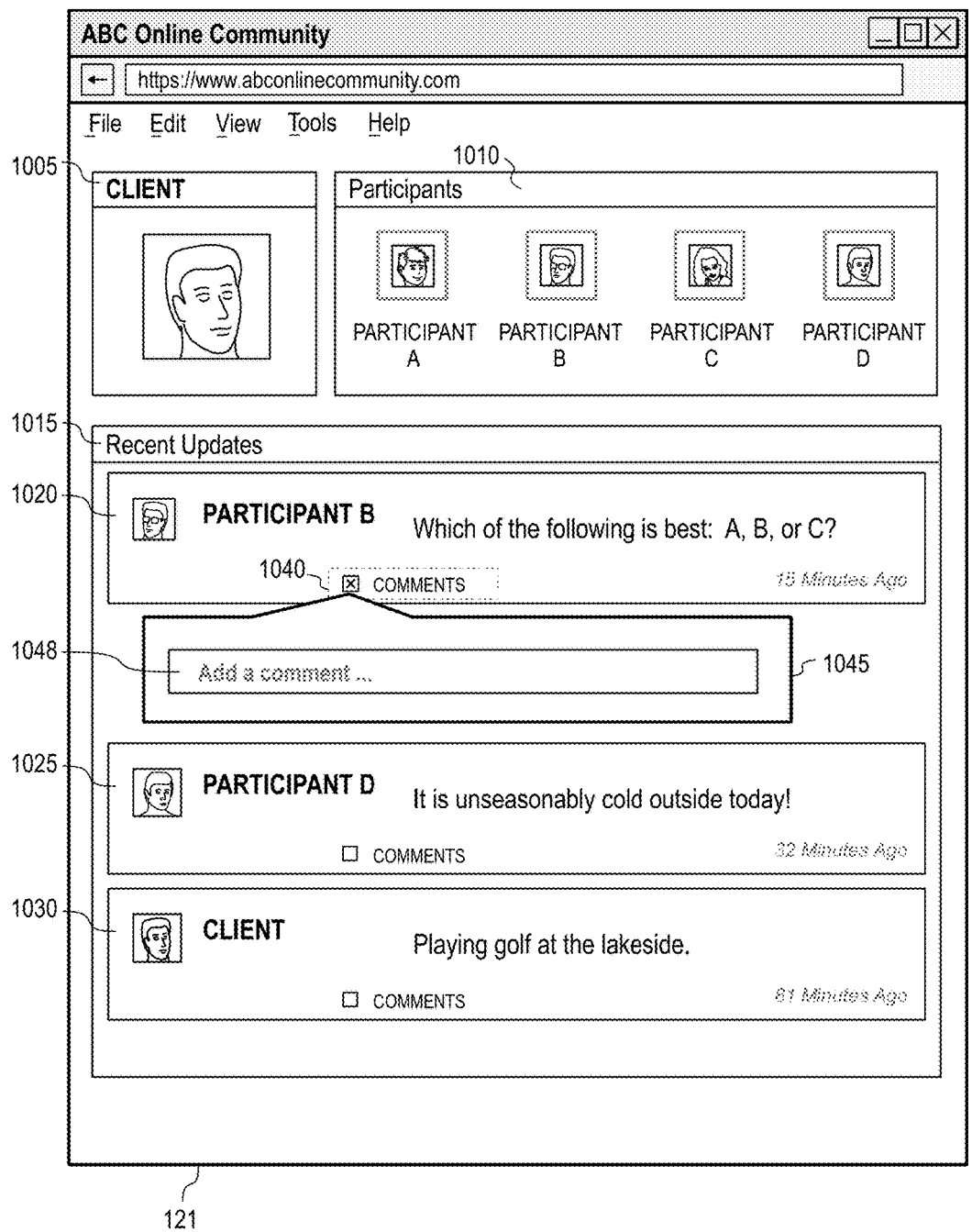
FIG. 10 illustrates a client online application interface, according to a further embodiment.

FIG. 10 illustrates online application interface 121 as presented by client application 119, according to a further embodiment. Online application interface 121 may include a client identification section 1005, a participant identification section 1010, and an activity stream 1015. Client identification section 1005 may include a profile identifier for the user of client application 119. Participant identification section 1010 may include all or a subset of participants associated with the user within client application 119. As shown, client identification section 1005 includes a profile identifier in the form of a thumbnail image for the client, and participant identification section 1010 includes respective profile identifiers in the form of thumbnail images for Participant A, Participant B, Participant C, and Participant D.

Activity stream 1015 may display recent activity stream updates associated with the client and the participants included in participant identification section 1010. Each activity stream update may include a content post. As shown in FIG. 10, activity stream 1015 includes activity stream update 1020 posted by Participant B, activity stream update 1025 posted by Participant D, and activity stream update 1030 posted by the client. Each activity stream update may include an option 1040 to display or enter comments posted in response to the update or otherwise associated with the update. Since option 1040 is selected for activity stream update 1020, online application interface 121 in this example displays comment dialog box 1045. Comment dialog box 1045 includes a text box element 1048, which may accept new comments in response to activity stream update 1020.

Figure 11:
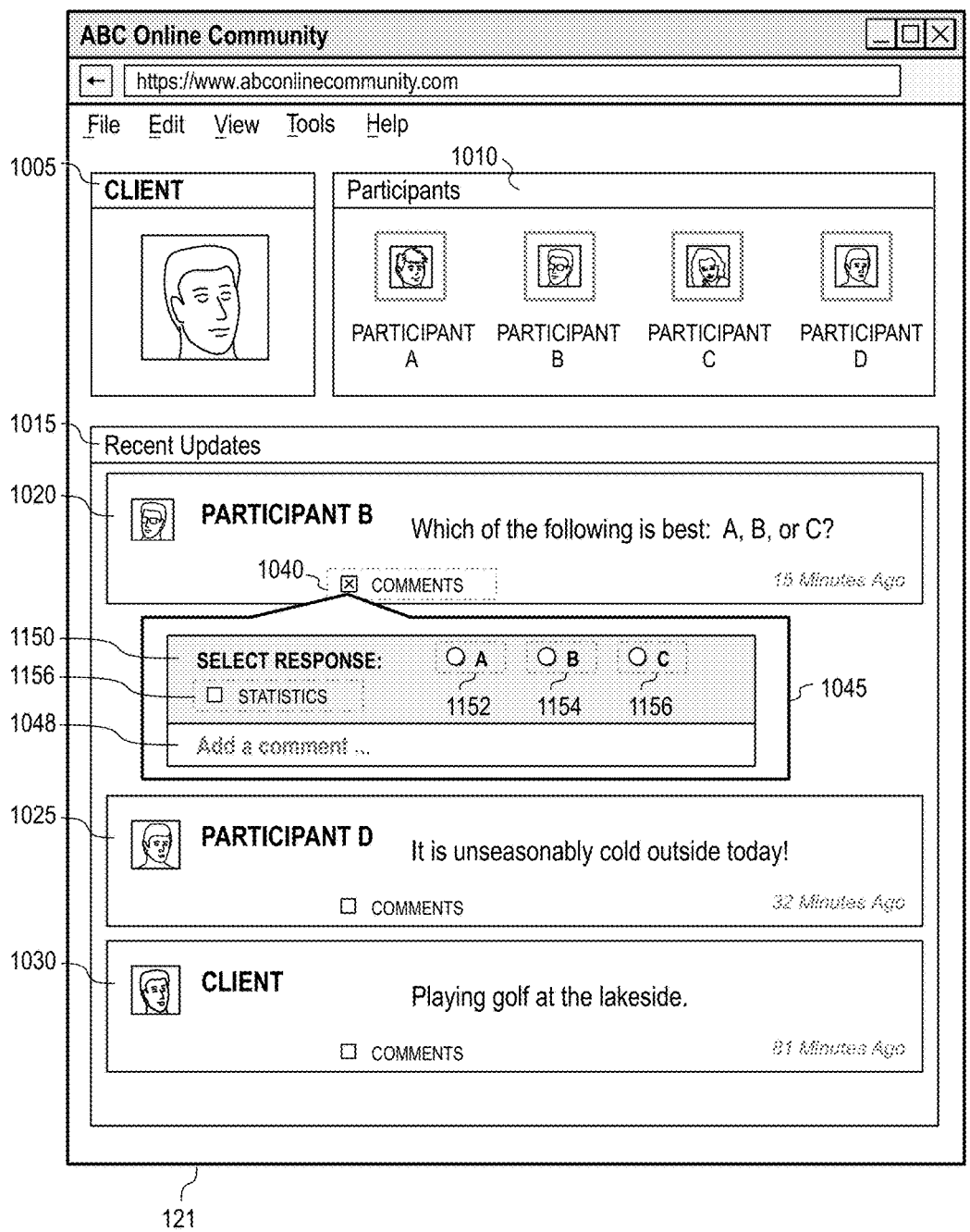
FIG. 11 illustrates an example scenario of generating and displaying a form response interface for a content post in the online application interface illustrated in FIG. 10, according to an embodiment.

FIG. 11 illustrates an example scenario of generating and displaying a form response interface in online application interface 121 as provided in FIG. 10. More specifically, in this example, client application 119 may update online application interface 121 to display a form response interface element according to the methods 200-400. According to step 205 of the method 200, client application 119 may identify a newly created content post. Specifically, client application 119 may identify activity stream update 1020 immediately upon creation for purposes of this example. According to step 210, client application 119 may facilitate evaluation of the content post within activity stream update 1020. In this example, client application may facilitate such evaluation according to steps of the method 300.

According to step 305 of the method 300, client application 119 may facilitate parsing of the language of the content post in activity stream update 1020. Specifically, client application 119 may send the language in activity stream update 1020 to data parsing application 151, which may generate and return parsed language to client application 119. According to step 310, client application 119 may determine that the parsed language includes an interrogatory element. In this example, client application 119 may determine that the phrase "Which of the following" within the content post is an interrogatory element. According to step 315, client application may send the parsed language to NLP application 153, which may analyze the format of the interrogatory element and consequently may associate any relevant predetermined options with the interrogatory element in the parsed language of the content post. In this example, based on the language "A, B, or C" within the parsed language of the content post, NLP application 153 may associate the alternatives "A", "B", and "C" with the interrogatory element "Which of the following" within the parsed language of the content post. NLP application 153 may generate NLP application data 161 based on such association and may return the data to client application 119. According to step 320, based on the data generated by NLP application 153, the client application 119 may determine that the interrogatory element "Which of the following" permits selection of a response among multiple predetermined options, specifically alternatives "A", "B", and "C". Consequently, according to step 325 client application 119 may mark the content post of activity stream update 1020 as form-addressable.

Subsequently, according to step 215, client application 119 may determine that the content post of activity stream update 1020 is form-addressable based on the marking of the content post according to step 325. As shown in FIG. 11, according to steps 220 and 225, client application 119 may generate a form response interface element 1150 and may update online application interface 121 to display the generated form response interface element 1150 within comment dialog box 1045. In this example, client application 119 may generate form response interface element 1150 according to steps of the method 400. According to the method 400, for each predetermined option identified at step 320, client application 119 may create a user-selectable alternative element and may add such user-selectable alternative element to form response interface element 1150. Specifically, since alternatives "A", "B", and "C" were identified at step 320, client application 119 may create and add to form response interface element 1150 a user-selectable alternative element 1152 corresponding to alternative "A", a user-selectable alternative element 1154 corresponding to alternative "B", and a user-selectable alternative element 1156 corresponding to alternative "C". Alternative elements 1152, 1154, and 1156 each may include a radio button selectable by the user.

According to step 230, client application 119 may generate statistics based on each of the user-selectable alternative elements 1152, 1154, and 1156 included in form response interface element 1150. Specifically, client application 119 may create a vote tally that reflects responses received for the content post of activity stream update 1020. As shown in FIG. 11, online application interface 121 may include an option 1156 to display such statistics. In an alternative embodiment, client application 119 may update online application interface 121 to display statistics automatically upon receiving a threshold number of votes and/or comments.

Figure 12:
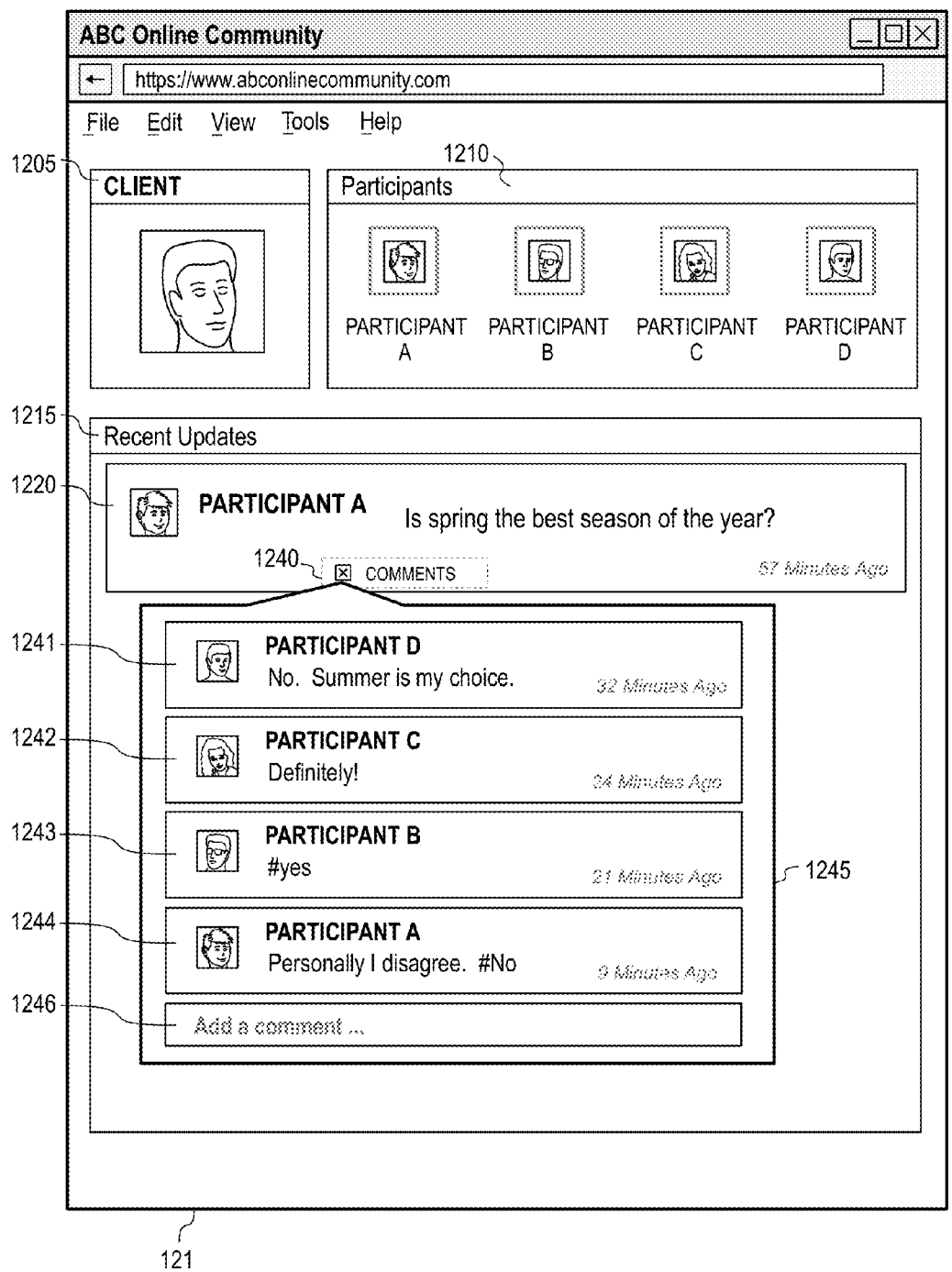
FIG. 12 illustrates a client online application interface, according to a further embodiment.

FIG. 12 illustrates online application interface 121 as presented by client application 119, according to a further embodiment. Online application interface 121 may include a client identification section 1205, a participant identification section 1210, and an activity stream 1215. Client identification section 1205 may include a profile identifier for the user of client application 119. Participant identification section 1210 may include all or a subset of participants associated with the user within client application 119. As shown, client identification section 1205 includes a profile identifier in the form of a thumbnail image for the client, and participant identification section 1210 includes respective profile identifiers in the form of thumbnail images for Participant A, Participant B, Participant C, and Participant D.

Activity stream 1215 may display recent activity stream updates associated with the client and the participants included in participant identification section 1210. Each activity stream update may include a content post. As shown in FIG. 12, activity stream 1215 includes activity stream update 1220 posted by Participant A. Activity stream update 1220 may include an option 1240 to display or enter comments posted in response to the update or otherwise associated with the update. Since option 1240 is selected for activity stream update 1220, online application interface 121 in this example displays comment dialog box 1245 including comments posted in response to activity stream update 1220. Comment dialog box 1245 includes comment 1241 posted by Participant D, comment 1242 posted by Participant C, comment 1243 posted by Participant B, and comment 1244 posted by Participant A. Additionally, comment dialog box 1245 includes a text box element 1246, which may accept new comments in response to activity stream update 1220.

Figure 13:
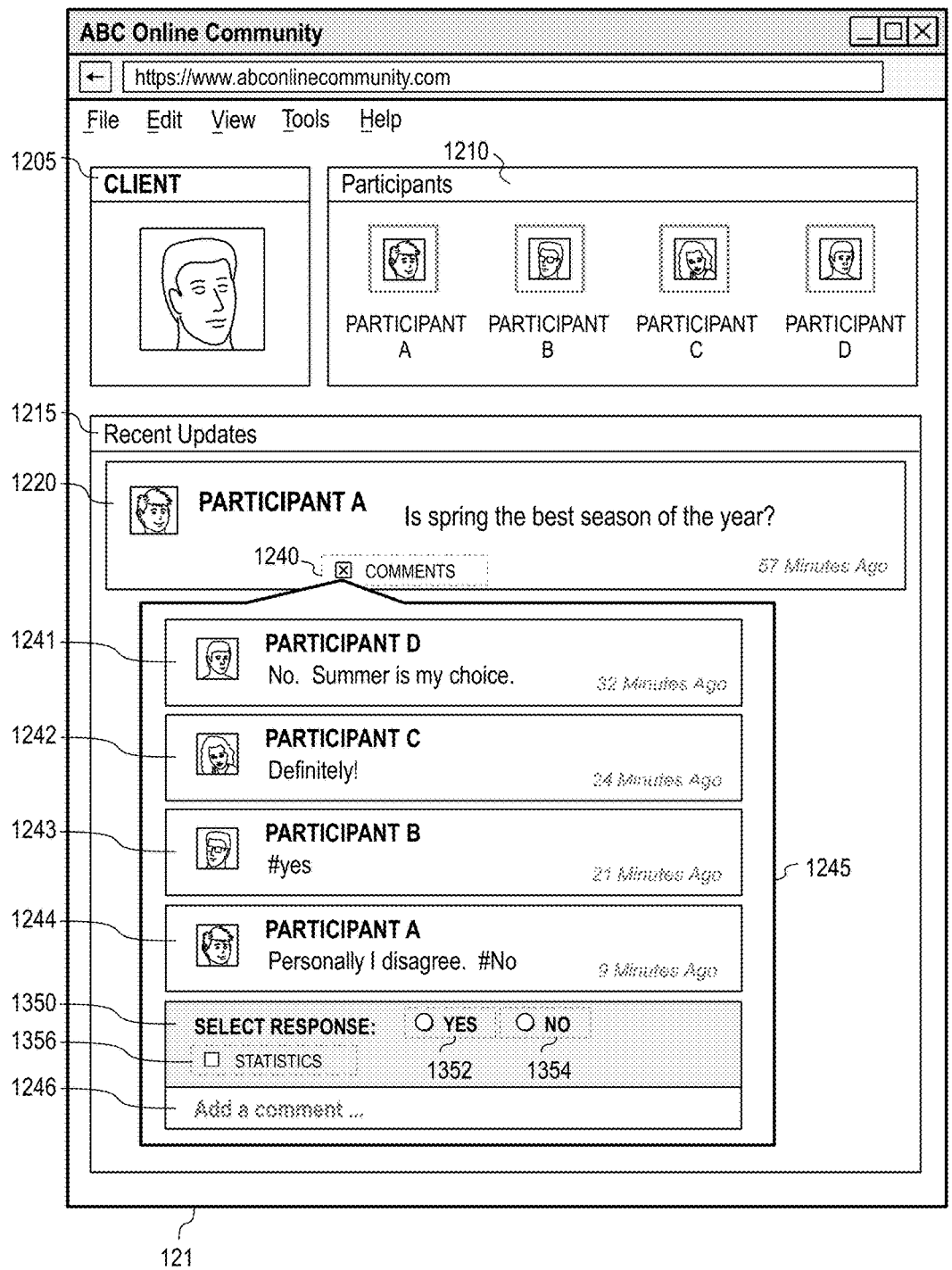
FIG. 13 illustrates an example scenario of generating and displaying a form response interface for a content post in the online application interface illustrated in FIG. 12, according to an embodiment.

FIG. 13 illustrates an example scenario of generating and displaying a form response interface in online application interface 121 as provided in FIG. 12. More specifically, in this example, client application 119 may update online application interface 121 to display a form response interface element according to the methods 200 and 500-600. According to step 205 of the method 200, client application 119 may identify a newly updated content post. Specifically, client application 119 may identify, at a point in time following an assumed specified time interval of 60 minutes for purposes of this example, activity stream update 1220 and comments 1241, 1242, 1243, and 1244. According to step 210, client application 119 may facilitate evaluation of the content post within activity stream update 1220. In this example, client application may facilitate such evaluation according to steps of the method 500.

According to step 505 of the method 500, client application 119 may identify comments associated with the content post of activity stream update 1220. Specifically, client application 119 may identify comments 1241, 1242, 1243, and 1244. According to step 510, client application 119 may determine whether a first designated threshold number of comments associated with the content post exist. For this example, it is assumed that the first designated threshold is four comments. Thus, client application 119 may determine that a first designated threshold number of comments associated with the content post exist.

Consequently, according to step 515 client application 119 may send language of comments 1241, 1242, 1243, and 1244 to NLP application 153. According to step 520, client application 119 may determine, via NLP application 153, whether a second designated threshold number of associated comments exist that include common language elements capable of being expressed via multiple predefined options. For this example, it is assumed that the second designated threshold is three comments. In this example, based on iterative comparison, NLP application 153 may determine the presence of synonymous affirmative language in a word of comment 1242 ("Definitely") and a hashtag of comment 1243 ("#yes"). NLP application 153 further may determine the presence of identical negative language in a word of comment 1241 ("No") and a hashtag of comment 1244 ("#No"). Accordingly, NLP application 153 may determine that comments 1242 and 1243 exist including common language elements and further may determine that comments 1241 and 1244 exist including common language elements. Thus, NLP application 153 may determine that a total of four comments include common language elements. Additionally, based on an analysis of such common language elements, NLP application 153 may identify an affirmative predefined option ("YES") based on the common language elements of comments 1242 and 1243 and further may identify a negative predefined option ("NO") based on the common language elements of comments 1241 and 1244. Thus, client application 119 may determine that a second designated threshold number of associated comments exist including common language elements capable of being expressed via multiple predefined options. Consequently, according to step 525 client application 119 may mark the content post of activity stream update 1220 as form-addressable.

Subsequently, according to step 215, client application 119 may determine that the content post of activity stream update 1220 is form-addressable based on the marking of the content post according to step 525. As shown in FIG. 13, according to steps 220 and 225, client application 119 may generate a form response interface element 1350 and may update online application interface 121 to display the generated form response interface element 1350 within comment dialog box 1245. In this example, client application 119 may generate form response interface element 1350 according to steps of the method 600. According to the method 600, for each predefined option identified at step 520, client application 119 may create a user-selectable alternative element and may add such user-selectable alternative element to form response interface element 1350. Specifically, since an affirmative alternative (e.g., "YES") and a negative alternative (e.g., "NO") were identified at step 520, client application 119 may create and add to form response interface element 1350 an affirmative user-selectable alternative element 1352 corresponding to the affirmative alternative ("YES") and a negative user-selectable alternative element 1354 corresponding to the negative alternative ("NO"). Alternative elements 1352 and 1354 each may include a radio button selectable by the user.

According to step 230, client application 119 may generate statistics based on each of the user-selectable alternative elements 1352 and 1354 included in form response interface element 1350. Specifically, client application 119 may create a vote tally that reflects responses received for the content post of activity stream update 1220. As shown in FIG. 13, online application interface 121 may include an option 1356 to display such statistics. In an alternative embodiment, client application 119 may update online application interface 121 to display statistics automatically upon receiving a threshold number of votes and/or comments.

According to the various embodiments described herein, a client application may generate and display a form response interface for a content post in an online application. Generating a form response interface in accordance with the various embodiments may facilitate consistent evaluation of content posts and further may facilitate straightforward collection of statistics with respect to such evaluation. Furthermore, such form response interface may enable more rapid response entry among online application participants.

While the foregoing description is directed to various embodiments, such description is not intended to limit the scope of the invention. All kinds of modifications made to the described embodiments and equivalent arrangements should fall within the protected scope of the invention. Hence, the scope of the invention should be explained most widely according to the claims that follow in connection with the detailed description, and should cover all the possibly equivalent variations and equivalent arrangements. Accordingly, further embodiments may be devised without departing from the basic scope of the invention.

What is claimed is:

1. A computer program product comprising a computer readable storage medium having program instructions embodied therewith, the program instructions executable by a computing device to cause the computing device to:
   identify a content post in an online application interface;
   facilitate evaluation of the content post, wherein facilitating evaluation of the content post comprises:
      identifying associated comments submitted in response to the content post;
      upon determining that a first designated threshold number of the associated comments exist, sending language of the associated comments to a natural language processing application; and
      upon determining, via the natural language processing application, that a second designated threshold number of the associated comments exist that include common language elements capable of being expressed via multiple predefined options, marking the content post as form-addressable, wherein common language elements are identified by iteratively comparing language among the associated comments; and
   upon determining that the content post is form-addressable based on the evaluation:
      generate a form response interface element including multiple alternatives that respectively correspond to multiple user-selectable options for response to the content post, and generate statistics based on each of the multiple alternatives, wherein the statistics include a vote tally indicating a number of votes received for each of the multiple alternatives via the form response interface element from one or more users; and update the online application interface to display the form response interface element and the statistics with the content post.

2. The computer program product of claim 1, wherein generating the form response interface element comprises:
for each of the multiple predefined options:
creating a user-selectable alternative element corresponding to the predefined option; and
adding the user-selectable alternative element to the form response interface element.

3. The computer program product of claim 1, wherein the multiple alternatives include at least an affirmative alternative and a negative alternative if the content post includes an interrogatory element requiring an affirmative response or a negative response.

4. The computer program product of claim 1, wherein the program instructions further cause the computing device to:
upon updating the online application interface to display the statistics with the content post, hide all responses to the content post upon which the statistics are based.

5. The computer program product of claim 1, wherein iteratively comparing the language among the associated comments comprises determining a direct match relationship or a synonymous relationship between respective language elements.

6. The computer program product of claim 1, wherein the program instructions further cause the computing device to:
upon updating the online application interface to display the statistics with the content post, display with the vote tally, for each of the multiple alternatives, a listing of each user who voted for the alternative.

7. The computer program product of claim 1, wherein the vote tally further indicates, for each of the multiple alternatives, a number of comments received in response to the content post that are reflective of the alternative.

8. The computer program product of claim 7, wherein the program instructions further cause the computing device to:
upon updating the online application interface to display the statistics with the content post, display with the vote tally, for each of the multiple alternatives, a listing of each user who provided a comment in response to the content post that is reflective of the alternative.

9. The computer program product of claim 1, wherein the form response interface element and the statistics are displayed adjacent to language of the content post.

10. A system comprising:
a processor; and
a memory storing an application program, which, when executed on the processor, performs an operation comprising:
identifying a content post in an online application interface;
facilitating evaluation of the content post, wherein facilitating evaluation of the content post comprises:
identifying associated comments submitted in response to the content post;
upon determining that a first designated threshold number of the associated comments exist, sending language of the associated comments to a natural language processing application; and
upon determining, via the natural language processing application, that a second designated threshold number of the associated comments exist that include common language elements capable of being expressed via multiple predefined options, marking the content post as form-addressable, wherein common language elements are identified by iteratively comparing language among the associated comments; and
upon determining that the content post is form-addressable based on the evaluation:
generating a form response interface element including multiple alternatives that respectively correspond to multiple user-selectable options for response to the content post, and generate statistics based on each of the multiple alternatives, wherein the statistics include a vote tally indicating a number of votes received for each of the multiple alternatives via the form response interface element from one or more users; and
updating the online application interface to display the form response interface element and the statistics with the content post.

11. The system of claim 10, wherein generating the form response interface element comprises:
for each of the multiple predefined options:
creating a user-selectable alternative element corresponding to the predefined option; and
adding the user-selectable alternative element to the form response interface element.

12. The system of claim 10, wherein the multiple alternatives include at least an affirmative alternative and a negative alternative if the content post includes an interrogatory element requiring an affirmative response or a negative response.

13. The system of claim 10, wherein the operation further comprises:
upon updating the online application interface to display the statistics with the content post, hiding all responses to the content post upon which the statistics are based.

14. The system of claim 10, wherein iteratively comparing the language among the associated comments comprises determining a direct match relationship or a synonymous relationship between respective language elements.

15. The system of claim 10, wherein the operation further comprises:
upon updating the online application interface to display the statistics with the content post, displaying with the vote tally, for each of the multiple alternatives, a listing of each user who voted for the alternative.

16. The system of claim 10, wherein the vote tally further indicates, for each of the multiple alternatives, a number of comments received in response to the content post that are reflective of the alternative.

17. The system of claim 16, wherein the operation further comprises:
upon updating the online application interface to display the statistics with the content post, displaying with the vote tally, for each of the multiple alternatives, a listing of each user who provided a comment in response to the content post that is reflective of the alternative.

18. The system of claim 10, wherein the form response interface element and the statistics are displayed adjacent to language of the content post.

* * * * *